United States Patent [19]

Ballantyne

[11] Patent Number: 4,828,474
[45] Date of Patent: May 9, 1989

[54] HYDRAULIC CYLINDER DEVICE FOR PLATEN SPACING INDICATION AND CONTROL

[75] Inventor: Ronald Ballantyne, Burlington, Canada

[73] Assignee: John T. Hepburn, Limited, Mississauga, Canada

[21] Appl. No.: 100,489

[22] Filed: Sep. 24, 1987

[30] Foreign Application Priority Data

Oct. 10, 1986 [CA] Canada .................................. 520295

[51] Int. Cl.$^4$ ............................................ B29C 43/58
[52] U.S. Cl. ........................................ 425/150; 100/46;
100/258 R; 100/258 A; 264/40.5; 425/167;
425/171; 425/411
[58] Field of Search ............... 100/46, 258 R, 258 A;
264/40.5; 425/150, 167, 171, 214, 406, 411

[56] References Cited

U.S. PATENT DOCUMENTS

| | | | |
|---|---|---|---|
| 4,076,780 | 2/1978 | Ditto | 264/40.5 |
| 4,589,830 | 5/1986 | Clawson | 425/150 |
| 4,648,823 | 3/1987 | Yashima | 425/150 |

*Primary Examiner*—Jay H. Woo
*Assistant Examiner*—Timothy W. Heitbrink
*Attorney, Agent, or Firm*—Sim & McBurney

[57] ABSTRACT

A press has upper and lower platens which can be moved towards and away from one another. Four hydraulic leveling cylinders are mounted in a vertical orientation on the lower platen for purposes of platen parallelism control. In preferred form, each cylinder has a piston rod which engages an associated post on the upper platen as the platens approach one another. The piston rod and associated piston are formed with a longitudinal bore open at the upper piston rod end, and a rigid shaft is mounted in the bore with a lower end extending through the bottom of the cylinder housing. A coil spring in the interior of the piston rod urges the rigid shaft upwardly until a collar formed on the shaft engages a stop surface, the upper shaft end then being flush with the upper piston rod end. The associated post is fixed to the upper press platen in-line with the piston rod and has an internal passage in which is located a stud-like shaft that engages the rigid shaft mounted in the piston rod. Changes in the spacing between platens, including changes attributable to axial contraction and expansion of the post and piston rod with varying applied loads, are consequently manifested as axial displacement of the lower end of the rigid shaft relative to the lower platen. A sensor detects this relative displacement, producing a signal indicating platen spacing at the leveling cylinder. Sensor signals from the four cylinders are used to control the cylinders so as to maintain platen parallelism.

10 Claims, 3 Drawing Sheets

HYDRAULIC CYLINDER DEVICE FOR PLATEN SPACING INDICATION AND CONTROL

FIELD OF THE INVENTION

The invention relates generally to the operation of presses, and more particularly to devices and methods for maintaining a predetermined relationship, such as parallelism, between press platens as they are moved relative to one another.

DESCRIPTION OF THE PRIOR ART

Hydraulic presses are now used extensively for compression molding of large and comparatively thin plastic products and subsequent in-mold coating of such products. Such processes require very strict control of platen parallelism and very accurate separation of mold halves attached to the platens in order to produce satisfactory results. At present, such presses are sometimes required to display no more than 0.001–0.005 inches of misalignment between press platens during compression phases of operation. During in-mold coating phases of operation, such presses may be required to separate mold halves in a well controlled manner by no more than about 0.001–0.005 inches despite forces arising within the mold, while maintaining the same strict platen parallelism requirements. A general understanding of press parallelism control may be obtained by reference to U.S. Pat. No. 4,076,780 which issued Feb. 28, 1978 to Edwin D. Ditto.

Special hydraulic presses have been constructed or proposed in recent years which lend themselves to stricter platen parallelism control than has previously been possible. However, there still remains in service a large number of very expensive hydraulic presses which were originally designated without a view to implementing contemporary compression molding and in-mold coating processes. Also, the general design of such earlier presses would still be preferred by many press users to more current designs, because of familiarity and known reliability, assuming that such presses could be manufactured with means providing stricter parallelism control.

These earlier or standard presses commonly have a stationary lower platen and an upper moving platen which can be moved towards and away from the lower platen by means of a massive overhead ram. They are often characterized by a very robust frame which includes a pair of opposing side slabs (alternatively plates or posts) that support the cross-head from which the ram is suspended and into which forces generated during compression of a work piece are reacted. Certain inner surfaces of these side slabs are commonly formed with angled guide plates which co-operate with structure on the upper platen to ensure that the upper platen approaches and retreats from the lower platen in generally parallel relationship. However, the platen guiding structure associated with such presses is inadequate to maintain the platen parallelism described above.

Measures have been proposed to adapt such prior presses for very strict control of platen parallelism. These measures have commonly involved the mounting of hydraulic leveling cylinders on the lower platen, one essentially at each corner of the platen. The piston rods associated with such leveling cylinders might be attached directly to the upper platen; however, since strict parallelism control would not normally be required except during a limited range of platen movement associated with actual compression of a mold and initial separation of mold halves, it is common to provide comparatively short leveling cylinders which engage the upper platen only when the platens are separated by less than a preselected distance. Each leveling cylinder is associated with a platen spacing sensor that indicates platen separation as close to the cylinder as is conveniently possible. A microprocessor might be used to control actuation of the leveling cylinders in response to the spacing signals so as to resist downward movement of the upper platen in a manner which maintains a parallel relationship between the platens. Platen parallelism might also be controlled by appropriate actuation of the leveling cylinders during intial separation of mold halves.

A number of sensors have been proposed for use in such platen leveling systems. One sensing arrangement involves a length of wire whose upper end is fixed to the piston rod associated with a leveling cylinder or to the upper platen and whose lower end is wound on a drum which is constantly subjected to a rotational force to ensure that the wire is always taut. Angular rotation of the drum can be detected with an appropriate potentiometer to provide a signal indicating relative platen spacing or position. Another alternative is to fix the two major components of a magnetic track and complementary sensor head to the upper and lower platen, the sensor head being mounted on a rod which places the head in contact with the magnetic track over a finite range of movement corresponding to compression phases of operation. A major problem in equiping prior presses with such leveling cylinders and sensors is that the sensors are largely exposed. In view of the type of environments in which such hydraulic presses are commonly used, it would not be unexpected for such sensors to be damaged by mobile equipment, such as forklifts or the like, commonly used in the vicinity of the press.

It would be desirable provide a platen spacing device which can be used to adapt even standard or conventional press designs for stricter control of platen parallelism, including means for sensing platen spacing which are not immediately exposed to sensor damage.

BRIEF SUMMARY OF THE INVENTION

In one aspect, the invention provides a device for use in regulating the spacing between first and second press platens at least when the platens are separated by less than a predetermined distance. The device includes a hydraulic cylinder having a cylinder housing which can be connected to the first press platen, a piston, a piston rod attached to the piston and having an end external to the housing which can be engaged by the second press platen. A bore is formed in the piston and piston rod, and a rigid shaft is located within the bore, the shaft having a first end proximate to the external piston rod end and a second opposing end external to the cylinder housing. Mounting means are provided which serve to mount the rigid shaft to the hydraulic cylinder for movement with the piston rod in response to axial displacement of the piston rod and also for axial movement relative to the piston rod in response to axial contraction and expansion of the piston rod as such changes in the length of the piston rod normally reflect changes in platen spacing. Sensor means respond to movement of the second shaft end by generating a position signal indicating the position of the second shaft end relative to the first press platen.

A number of such devices would be required for a press of the general type described above to permit platen parallelism control. The position signals generated by the devices would be used by appropriate control means to actuate the leveling devices in such a manner as to maintain the required spatial relationship between the platens.

Several advantages or functions associated with such a device should be noted. First, the rigid shaft and other components instrumental to spacing detection are in large measure internal to the hydraulic cylinder, the active spacing control means. Accordingly, such components are not as readily exposed to damage from mobile equipment or other potentially destructive equipment which might commonly be used near the press. To that end, the sensing means are most preferably located within a hollow structure formed at the appropriate end of the cylinder housing so that both the sensing means and the rigid shaft are entirely contained within the device.

Second, despite mounting of much of components required for separation sensing largely in the interior of the hydraulic for movement with its piston rod, sensing is not adversely affected by large compressive forces applied to the hydraulic cylinder. In the compression molding of plastic resin materials such a hydraulic cylinder might be required to withstand forces up to 150 tons. Even an appropriately-sized piston rod might be expected to contract axially, and subsequently to expand as loads are removed, by several thousands of an inch. If accompanying changes in platen spacing were not detected, this axial expansion and contraction would potentially defeat efforts to maintain parallelism to within 0.001-0.005 thousands of an inch.

These matters will be more readily appreciated from a description of a preferred embodiment below. Various additional inventive features will be apparent from the preferred embodiment and will be more specifically identified in the accompanying claims.

DESCRIPTION OF THE DRAWINGS

The invention will be better understood with reference to drawings in which.

DESCRIPTION OF PREFERRED EMBODIMENT

Figure 1:
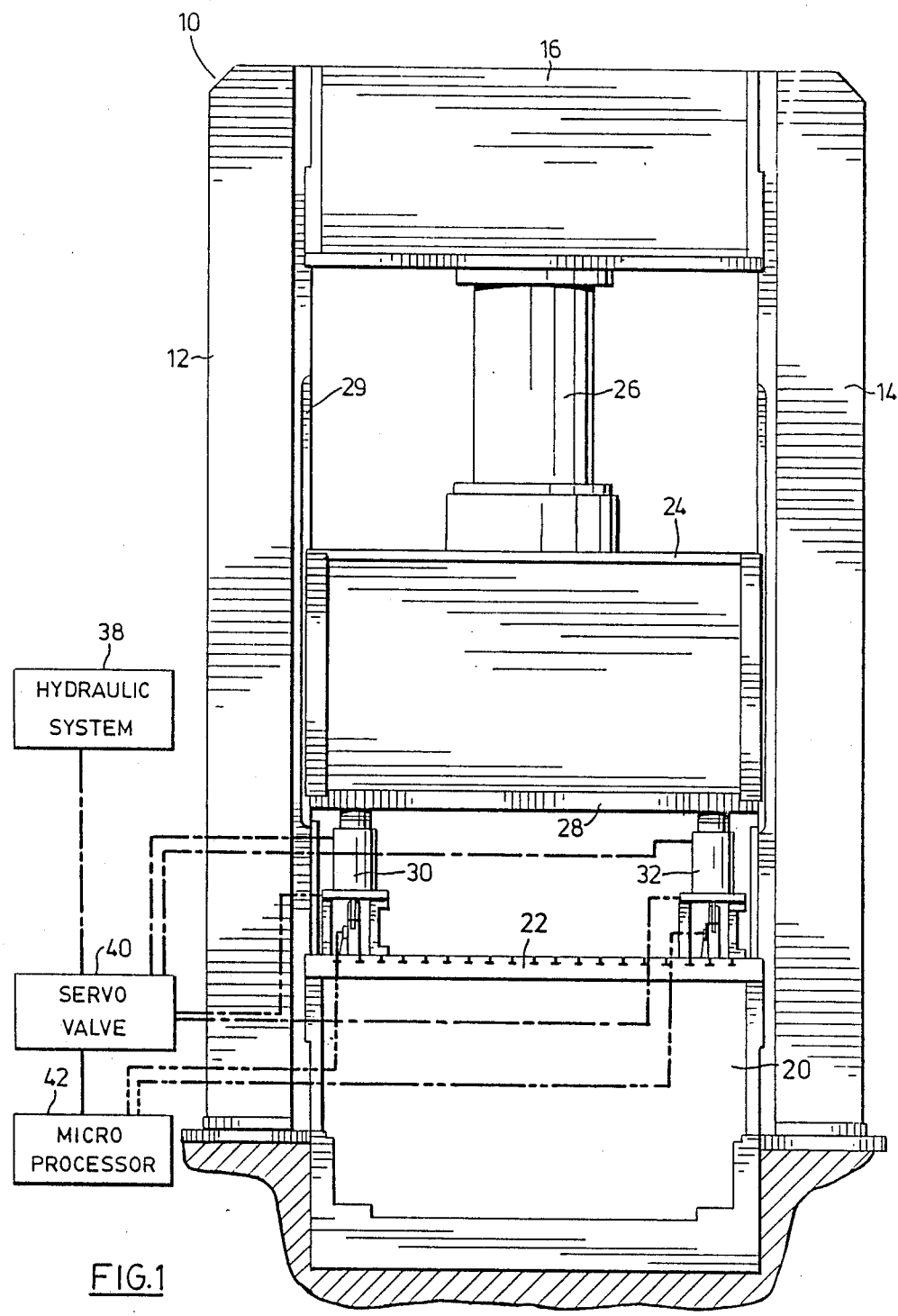
FIG. 1 is an elevational view of a press incorporating platen leveling cylinders embodying the invention.

Reference is made to FIG. 1 which illustrates a conventional hydraulic press 10. The press 10 has a frame which includes an opposing pair of side slabs 12, 14 and a cross-head 16 supported by the slabs. A lower stationary platen 20 is fixed to the bottom of the frame and has a T-slotted bolster plate 22 to which a lower mold member (not shown) can be bolted in a conventional manner. An upper platen 24 is carried by a central hydraulic ram 26 suspended from the cross-head 16 and can be moved by the ram 26 towards and away from the lower platen 20. The upper platen 24 has another T-slotted bolster plate 28 to which an upper mold member (not shown) can be bolted. The upper platen 24 is guided during its movement on the side slabs 12, 14 by angled guiding surfaces formed at inner corners of the side slabs 12, 14, such as the surface 29. This guiding arrangement is adequate for conventional pressing processes, but inadequate for maintenance of the platen parallelism control required in contemporary compression molding of plastic resins.

The press 10 is equiped for parallelism control by means of four hydraulic leveling cylinders 30-36 (even numbers only) and associated actuators. The leveling cylinders are mounted in generally vertical orientation inset from the corners of the lower platen 20. As apparent from the diagrammatic illustration of FIG. 3, the cylinders 30-36 are in a generally rectangular arrangement with the overhead ram 26 acting centrally through the rectangle. The four cylinders 30-36 are powered by a hydraulic actuating system 38 which might include a conventional hydraulic pump (not illustrated), and servo valves 40 permit regulation of the pressure of hydraulic fluid applied to the leveling cylinders 30-36 on a cylinder-by-cylinder basis. During compression phases of operation, the leveling cylinders 30-36 would be pressurized for expansion in order to resist downward movement of the upper platen 24 under the influence of the central ram 26. A microprocessor 42 responds to spacing signals generated by each of the leveling cylinders 30-36 by controlling the servo valves 40 in a manner which maintains a parallel relationship between the platens 20, 24. The details of the overall operation of such a platen leveling system are conventional and will be readily apparent to those skilled in the art.

Figures 2, 3:
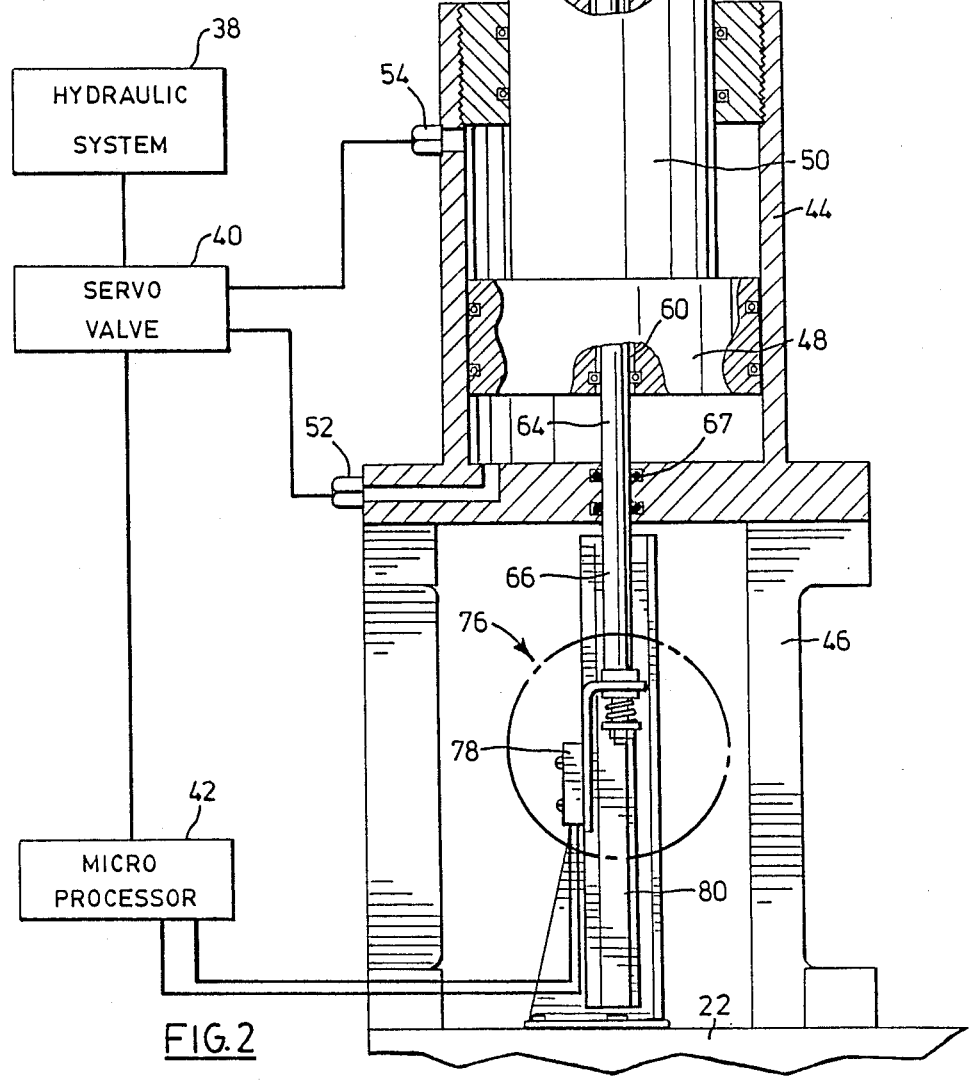
FIG. 2 is a fragmented view of one of the leveling cylinders.
FIG. 3 is a schematic representation of the relative placement of the leveling cylinders.

The construction of the leveling cylinder 30 which is typical of the four cylinders is most apparent in FIG. 2. The cylinder 30 has a generally cylindrical housing 44 the bottom of which is attached to a support housing or structure 46 by means of which the cylinder 30 can be bolted to the lower platen bolster plate 22. The cylinder 30 has a piston 48 which slides in sealed relationship with the interior of the cylinder housing 44, and a piston rod 50 attached to the piston 48 and extending vertically to points external to the housing 44. A lower port 52 permits hydraulic fluid under pressure to applied to the piston 48 for expansion of the cylinder 30, and an upper port 54 permits powered contraction of the cylinder 30.

The upper external end 56 of the piston rod 50 is defined by an apertured cap 58 bolted to the body of the piston rod 50. The piston rod end 56 is normally spaced from the upper platen 24 during phases of operation other than compression, when parallelism control is not required, but positioned to engage the upper platen 24 through structures associated with the upper platen 24 when the spacing between the platens 20, 24 has been reduced to less than a predetermined distance. This predetermined distance or separation would normally correspond to the height of a mold expected to be compressed between the platens 20, 24. The external piston rod end 56 might be fastened directly to the upper platen 24 for purposes of the invention; however, such an arrangement will in many instances be impractical as a very large cylinder would be required to accommodate the full travel of the upper platen 24.

A continuous longitudinal bore 60 is formed in the piston 48 and piston rod 50. The bore 60 will be seen to have an open end 62 at the external piston rod end 56 defined essentially by the aperture in the end cap 58. In this particular embodiment, the provision of the open bore end 62 at the external rod end 56 is important for purposes of accommodating contraction of certain post structure associated with the leveling cylinder 30. This will be discussed more fully below.

A rigid shaft 64 which is instrumental in platen spacing detection is mounted in the bore 60. A lower shaft end portion 66 extends freely from the bottom housing 44 into the internal cavity of the support housing 46. Seals 67 are provided in the bottom of the cylinder housing 44 to ensure that no leakage of hydraulic fluid occurs into the support housing 46 from about the shaft 64. An upper shaft end portion 68 is positioned adjacent the piston rod end 56. In this embodiment of the invention, a cylindrical internal compartment 70 is formed about the bore 60 adjacent the piston rod 50 external end. This compartment 70 houses a coil spring 72 through whose interior the shaft 64 extends. The coil spring 72 engages a collar 74 machined on the shaft 64, effectively acting between the piston rod 50 and the shaft 64 to urge the shaft 64 upwardly. A stop is provided to limit upward extension of the rigid shaft 64 beyond the external piston rod end 56. The stop is defined by the end cap 58 and the collar 74 fixed to the shaft 64. Engagement of these two members terminates upward travel of the rigid shaft 64 under the influence of the coil spring 72. Such mounting means ensure that the shaft 64 is always urged upwardly until the upper shaft end is flush with the active pushing surface of the piston rod 50, the external piston rod end 56. As regards selection of an appropriate coil spring 72, it is sufficient for purposes of this embodiment of the invention that the coil spring 72 be able to overcome gravitational and frictional forces applied to the rod.

The manner in which the shaft 64 is mounted causes the shaft 64 to be displaced axially with axial movement of the piston rod 50. The mounting also results in axial displacement of the rigid shaft 64 relative to the piston rod 50 as the piston rod 50 itself compresses or expands axially in response to loading, as during compression phases of operation. It will be apparent that any displacement of the lower shaft end portion 66 relative to the lower platen 20 would accordingly indicate changes in platen spacing, and in particular would reflect changes in platen spacing due to contraction or expansion of the piston rod 50 as compressive force applied to the piston rod 50 vary.

Figure 4:
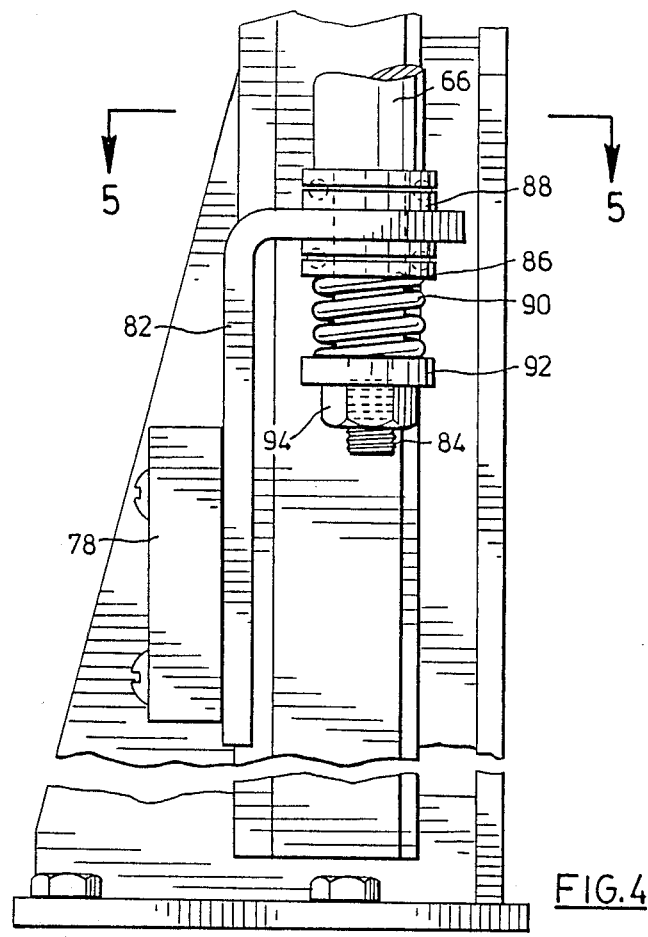
FIG. 4 is an enlarged plan view of a sensor associated with the leveling cylinder of FIG. 2; and, FIG. 5 is a view along the lines 5—5 of FIG. 4 further detailing the relationship between principal components of the sensor.
Figure 5:
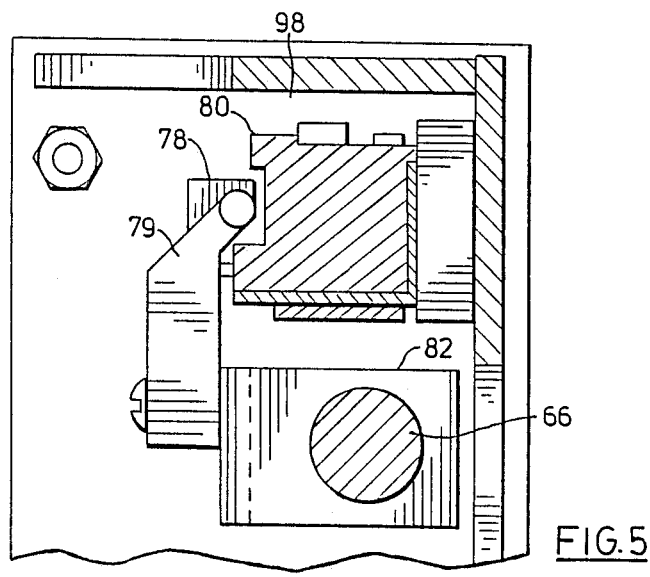

A sensor 76 is provided to detect movement of the lower shaft end portion 66 and to generate a signal indicating the position of the lower shaft end portion 66 relative to the lower platen 20. This sensor 76 has two principal components: a travelling sensor head 78 and a magnetic track 80, both conventional, the general arrangement of which will be apparent from FIGS. 4 and 5. The sensor head 78 is fixed to the lower shaft end portion 66 for travel therewith, while the track 80 is mounted on the lower platen, within the interior cavity of the support housing 46. The sensor head 78 is carried by a caliper-type connector 79 which is supported from an L-shaped mounting bracket 82. The bracket 82 is itself mounted on a threaded shaft section 84. One arm of the bracket 82 is sandwiched between a pair of thrust bearings 86, 88, the lower bearing 86 being biased upwardly by a coil spring 90 that acts between the lower bearing 86 and a washer 92 retaining on the threaded shaft section 84 with a nut 94. This connection arrangement permits the sensor head 78 to remain in an operative position within the track 80 (as apparent in FIG. 5) despite rotation of the rigid shaft 64 as, for example, in response to any piston rotation which might possibly occur. Signals indicating the position of the sensor head 78 relative to the track 80 (consequently the position of the lower shaft end portion 66 relative to the lower platen 20) are communicated to the microprocessor 42 which accordingly actuates the servo valves 40 to regulate platen spacing.

The leveling cylinder 30 will typically be used in association with a vertical post 100 attached to the upper platen in-line with the piston rod 50. The object of the arrangement is to permit convenient adjustment of the platen separation at which the leveling cylinder 30 actively engages the upper platen 24. Accordingly, molds of different height can be accommodated by essentially replacing the post 100 with one of a different length. The provision of a post for such purposes is, however, conventional.

The post 100 is structured, however, so that contraction of the post 100 does not deleteriously affect the sensing of platen spacing. The post 100 has a generally cylindrical body 102 with a base 104 (uppermost) which is bolted to the upper platen bolster plate 28. An apertured end cap 106 bolted to the bottom of the post 100 defines a post end surface 108 which directly engages the external piston rod end 56 during leveling operations. A longitudinal passage 110 is formed centrally in the interior of the body 102, with an open end at the post end surface 108. A rigid internal shaft 112 is located within the passage 110, an upper end 114 of the shaft 112 being fixed by means of a connection plate 116 to the base 104 and an opposing lower free end 118 terminating substantially flush with the post end surface 108. What should be noted about the post structure is that the rigid internal shaft 112 is not subjected to the compressive forces which act on the surrounding post body 102 during engagement with the leveling cylinder 30. The significance of this will become more apparent from the description immediately below of how the leveling cylinder 30 senses spacing between the platens 20, 24.

FIG. 2 shows the post 100 abutted with the piston rod 50 as would be the case during leveling of the upper platen 24 relative to the lower platen 20. In particular, it should be noted that the free end 118 of the internal post shaft 112 is then abutted with the upper end of the rigid shaft 64. The shaft 64 and the post internal shaft 112 in such circumstances define essentially a continuous measuring rod which displaces with the upper platen 24. It is advantageous for simplicity of design that these shaft ends be flush with the end surfaces of the piston rod 50 and post 100 in which they are located; however, it will be apparent that this is not critical to ensuring that the shaft ends properly engage. Assuming that the leveling cylinder 30 is offering no significant resistance to downward movement of the upper platen 24, the piston rod 50 is simply displaced axially downwardly as the upper platen 24 approaches the lower platen 20. The lower shaft end portion 66 together with the sensor head 78 are consequently displaced downwardly by a corresponding amount, and changes in platen spacing are consequently sensed by the sensor head 78.

. Assuming, however, that the leveling cylinder 30 is hydraulically actuated to resist downward movement of the upper platen 24, both the post 100 and piston rod 50 can be expected to contract axially. As regards contraction of the post 100, contraction of the cylindrical post body 102 does not affect the central rigid shaft 112 which simply extends into the bore 60 formed in the piston rod 50. Accordingly, the post shaft 112 pushes the rigid shaft 64 downwardly by an amount corresponding to the contraction of the post 100. The sensor head 78 is similarly displaced relative to the magnetic track 80, and accordingly changes in the spacing between the platens 20, 24 which result from a contraction of the post 100 are detected. As regards contraction of the piston rod 50, the rigid shaft 64 is not affected by such contraction due to its spring-mounting within the cylinder bore 60. Axial contraction of the piston rod 50 produces a corresponding downward displacement of the rigid shaft 64 relative to the post rod 50, and since this axial contraction reflects a change in platen spacing, this spacing change is sensed by the sensor 76. Expansion of the piston rod 50 itself with a reduction in loading reflects an increase in the separation between the upper and lower platens, and the spring-biasing of the rigid shaft 64 upwardly, or more generally towards the external piston rod end 56, permits the sensor 76 to detect such spacing changes.

A number of design alternatives within the ambit of the present invention should be noted. In particular, if the leveling cylinder 30 is not to be associated with the vertical post 100 but to act directly on the upper platen 24, the spring-biased mounting of the rigid shaft 64 within the piston rod 50 would not necessarily be required. In such circumstances, the upper shaft end portion 68 might be rigidly fixed directly to the end cap 58 associated with the piston rod 50. Such a mounting arrangement, which rigidly attaches the upper shaft end portion 68 proximate to the external rod end 56, accomplishes two important functions: first, the rigid shaft 64 will be axially displaced with axial displacement of the piston rod 50; and second, the rigid shaft 64 will be axially displaced in response to axial compression or expansion of the piston rod 50 itself. Each of these effects indicates a change in platen spacing, a change which can be detected by the sensor 76. To ensure that there is a proper response to platen spacing changes associated with axial contraction or expansion of the piston 48, it would be important with any rigid fastening system to ensure that the appropriate shaft end is attached as close as possible to the external piston rod end as this ensures that substantially the full measure of contraction of the piston rod can be detected. Since the piston rod may contract several thousandths of an inch over its full length, failure or sense or accommodate all of the piston rod's contraction may significantly interfere with platen parallelism control.

It will be appreciated that a particular embodiment of the invention has been described and that other modifications may be made therein without departing from the spirit of the invention or the scope of the appended claims.

I claim:

1. A device for use in regulating spacing between first and second moving press platens at least when the platens are separated by less than a predetermined distance, comprising:
    a hydraulic cylinder having a cylinder housing connected to the first press platen, a piston located within the cylinder housing, a piston rod attached to the piston for movement therewith, the piston rod having an end external to the cylinder housing, a bore formed in the piston rod and piston, the bore having an open end at the external piston rod end;
    a rigid shaft located within the bore and movable along the bore relative to the external piston rod end, the shaft having a first end portion proximate to the external piston rod end and a second opposing shaft end portion;
    biasing means for urging movement of the shaft along the bore towards the external piston rod end;
    stop means for preventing movement of the first shaft end portion beyond a predetermined position relative to the piston rod end; and,
    sensor means responsive to movement of the second shaft end portion for generating a position signal indicating the position of the second shaft end portion relative to the first press platen.

2. The device as claimed in claim 1 including a post separate from the hydraulic cylinder, the post comprising:
    a base portion attached to the second platen;
    a post end surface oppositely disposed from the base portion for engaging the external piston rod end;
    a passage having an open end at the post end surface;
    a rigid member located within the passage, the rigid member having a fixed end portion attached to the base portion and a free end portion positioned at the open end of the passage for engagement with the first shaft end portion when the post end surface engages the external piston rod end.

3. The device as claimed in claim 1 in which:
    the piston rod has an internal compartment formed about the bore adjacent to the external piston rod end;
    the stop means comprise
    (a) an end cap secured to the piston rod, the end cap defining the external piston rod end and the open end of the bore,
    (b) a stop member attached to the shaft and located within the internal compartment the stop member engaging the end cap to prevent movement of the first shaft end portion beyond the predetermined position; and,
    the biasing means comprise a spring mounted in the internal compartment and acting between the piston rod and the shaft.

4. The device as claimed in claim 1 comprising a support structure having an internal cavity into which the second shaft end portion extends.

5. The device as claimed in claim 4 in which the sensing means comprise a first sensor member mounted on the second shaft end portion in the internal cavity of the support structure and a second sensor member mountable to the first platen in the internal cavity proximate to the first sensor member, the first and second sensor members cooperating to generate the position signal.

6. A press comprising:
    a first platen;
    a second platen;
    means for moving the platens towards and away from one another along a predetermined axis;
    a multiplicity of spacing control devices each including
    (a) a hydraulic cylinder having a cylinder housing attached to the first press platen, a piston located within the cylinder housing, a piston rod attached to the piston, the piston rod having an piston rod end external to the housing, and a bore formed in the piston rod and piston and having an open end at the external piston rod end, (b) a rigid shaft located within the bore and movable along the bore relative to the external piston rod end, the shaft having a first end portion proximate to the external piston rod end and a second opposing end portion, (c) biasing means for urging movement of the shaft along the bore towards the external piston rod end portion;

(d) sensor means for sensing movement of the second shaft end portion and for generating a position signal indicating the position of the second shaft end portion relative to the first press platen;

(d) a post axially aligned with piston rod, the post comprising a base portion attached to the second platen, a post end surface positioned to engage the external piston rod end at least when the platens are separated by less than a predetermined distance, a passage having an open end at the post end surface, a rigid member located within the passage, the rigid member having a fixed end portion attached to the base portion and a free end, the free end being engaged with the first end portion of the shaft of the associated hydraulic cylinder at least when the platens are separated predetermined distance; and, control means for regulating the operation of the spacing control devices to maintain a predetermined spatial relationship between the first and second platens at least when the platens are separated by less than the predetermined distance, the control means including hydraulic actuating means for applying hydraulic fluid under controllable pressure to the hydraulic cylinders associated with the spacing control devices, the control means varying the pressure applied to each of the cylinders in response to the position signals generated by the sensor means associated with the spacing control devices to maintain the predetermined spatial relationship.

7. The press as claimed in claim 6 in which each of the spacing control devices comprises stop means for preventing movement of the respective first shaft end portion beyond a predetermined position relative to the respective external piston rod end.

8. The press as claimed in claim 7 in which in each of the spacing control devices:
the piston rod has an internal compartment formed about the bore adjacent the piston external end;
the stop means comprise
(a) an end cap secured to the piston rod, the end cap defining the external piston rod end and the open end of the bore;
(b) a stop member attached to the shaft, located within the internal compartment and engagable with the end cap;
the biasing means comprise a spring mounted in the internal compartment of the piston rod and acting between the piston rod and the shaft.

9. The press as claimed in claim 6 in which each of the spacing control devices comprises a support structure adapted to support the associated hydraulic cylinder from the first press platen, the support structure having an internal cavity into which the second shaft end portion of the spacing control device extends.

10. The press as claimed in claim 9 in which the sensing means associated with each spacing control device comprise a first sensor member mounted on the second shaft end portion in the internal cavity of the associated support structure and a second sensor member mounted to the first platen within the internal cavity proximate to the first sensor member, the first and second sensor members cooperating to generate the position signal.

* * * * *